US012694490B2

(12) United States Patent
Rodrigues et al.

(10) Patent No.: US 12,694,490 B2
(45) Date of Patent: Jul. 28, 2026

(54) IMAGE AUGMENTATION APPARATUS, CONTROL METHOD, AND NON-TRANSITORY COMPUTER-READABLE STORAGE MEDIUM

(71) Applicant: NEC Corporation, Tokyo (JP)

(72) Inventors: Royston Rodrigues, Tokyo (JP); Masahiro Tani, Tokyo (JP)

(73) Assignee: NEC CORPORATION, Tokyo (JP)

(*) Notice: Subject to any disclaimer, the term of this patent is extended or adjusted under 35 U.S.C. 154(b) by 674 days.

(21) Appl. No.: 18/019,436

(22) PCT Filed: Aug. 13, 2020

(86) PCT No.: PCT/JP2020/030813
§ 371 (c)(1),
(2) Date: Feb. 2, 2023

(87) PCT Pub. No.: WO2022/034678
PCT Pub. Date: Feb. 17, 2022

(65) Prior Publication Data
US 2023/0289928 A1    Sep. 14, 2023

(51) Int. Cl.
*G06T 7/11*        (2017.01)
*G06T 3/60*        (2024.01)
(Continued)

(52) U.S. Cl.
CPC ................. *G06T 5/77* (2024.01); *G06T 3/60* (2013.01); *G06T 7/11* (2017.01); *G06V 10/774* (2022.01);
(Continued)

(58) Field of Classification Search
CPC ... G06T 5/77; G06T 3/60; G06T 2207/10032; G06T 2207/20081; G06T 2207/20084;
(Continued)

(56) References Cited

U.S. PATENT DOCUMENTS 5,115,271  A  *  5/1992  Hagopian .......... G03B 27/6278
                                              355/126
10,678,257  B2 *  6/2020  Schulter .................... G06T 7/50
(Continued)

FOREIGN PATENT DOCUMENTS

JP        2016062524  A  *  4/2016

OTHER PUBLICATIONS

Shi, Yujiao, et al. "Where am i looking at? joint location and orientation estimation by cross-view matching." Proceedings of the IEEE/CVF Conference on Computer Vision and Pattern Recognition. 2020. (Year: 2020).*

(Continued)

*Primary Examiner* — John Villecco
*Assistant Examiner* — Alexander John Rodgers
(74) *Attorney, Agent, or Firm* — Sughrue Mion, PLLC

(57) ABSTRACT

An image augmentation apparatus (2000) acquires an original training dataset (40). The original training dataset (40) includes a ground-view image (42) and an original aerial-view image (44). The image augmentation apparatus (2000) performs an image augmentation including a cropping process and a rotation process on the original aerial-view image (44) to generate an augmented aerial-view image (54). In the cropping process, a target region with a circle shape or a regular polygon shape is cropped from the original aerial-view image (44). In the rotation process, the original aerial-view image (44) is rotated. An angle of the rotation is a multiple of a center angle of the target region when the target region has a regular polygon shape. The image augmentation apparatus (2000) outputs an augmented training dataset (50) including the ground-view image (52) and the augmented aerial-view image (54).

15 Claims, 13 Drawing Sheets

(51) Int. Cl.

| | |
|---|---|
| *G06T 5/77* | (2024.01) |
| *G06V 10/75* | (2022.01) |
| *G06V 10/774* | (2022.01) |

(52) U.S. Cl.
CPC .............. *G06T 2207/10032* (2013.01); *G06T 2207/20081* (2013.01); *G06T 2207/20084* (2013.01); *G06T 2207/20132* (2013.01); *G06V 10/759* (2022.01)

(58) Field of Classification Search
CPC ............ G06T 2207/20132; G06T 7/11; G06V 10/759; G06V 10/774
See application file for complete search history.

(56) References Cited

U.S. PATENT DOCUMENTS

| | | | | |
|---|---|---|---|---|
| 12,118,744 | B2 * | 10/2024 | Miyahara | .................. G06T 7/73 |
| 2016/0093272 | A1 * | 3/2016 | Shiraga | ..................... G06T 3/60 |
| | | | | 345/649 |
| 2017/0363885 | A1 * | 12/2017 | Blum | ..................... G03B 13/10 |
| 2019/0197693 | A1 * | 6/2019 | Zagaynov | ............ G06V 30/412 |
| 2020/0020093 | A1 * | 1/2020 | Frei | ........................... G05D 1/24 |
| 2022/0172330 | A1 * | 6/2022 | Mason | ..................... G06T 5/50 |
| 2022/0207866 | A1 * | 6/2022 | Li | ........................... G06V 20/70 |
| 2022/0245936 | A1 * | 8/2022 | Valk | ....................... G06V 20/13 |
| 2023/0368576 | A1 * | 11/2023 | Stephen | .............. G06V 40/103 |

OTHER PUBLICATIONS

S. Schubert, P. Neubert, J. Pöschmann and P. Protzel, "Circular Convolutional Neural Networks for Panoramic Images and Laser Data," 2019 IEEE Intelligent Vehicles Symposium (IV), Paris, France, 2019, pp. 653-660, doi: 10.1109/IVS.2019.8813862. (Year: 2019).*

International Search Report for PCT Application No. PCT/JP2020/030813, mailed on Oct. 13, 2020.

Written opinion for PCT Application No. PCT/JP2020/030813, mailed on Oct. 13, 2020.

Liu Liu and Hongdong Li, "Lending Orientation to Neural Networks for Cross-view Geo-localization", 2019 IEEE/CVF Conference on Computer Vision and Pattern Recognition, Computer Research Repository, arXiv:1903.12351, Mar. 29, 2019.

Sijie Zhu, Taojiannan Yang and Chen Chen, "Revisiting Street-to-Aerial View Image Geo-localization and Orientation Estimation", Computer Research Repository, arXiv:2005.11592, May 23, 2020.

Matsumura, Miki et al., "Modeling 3D Scenes with Registration between Laser Range Data and Google Maps Image", IPSJ SIG Technical Reports, Nov. 20, 2008, vol. 2008, No. 115, pp. 169-176.

* cited by examiner

44

ROTATE BY 30°

EASY TO PREDICT ORIGINAL ORIENTATION
BASED ON EDGES OF ORIGINAL IMAGE
VISIBLE IN NEW IMAGE

44

CROP TARGET REGION
WITH REGULAR PENTAGON SHAPE

CENTER ANGLE=72°

ROTATE BY 72°                    ROTATE BY 144°

54                                          54

DIFFICULT TO PREDICT ORIGINAL ORIENTATION

IMAGE AUGMENTATION APPARATUS, CONTROL METHOD, AND NON-TRANSITORY COMPUTER-READABLE STORAGE MEDIUM

This application is a National Stage Entry of PCT/JP2020/030813 filed on Aug. 13, 2020, the contents of all of which are incorporated herein by reference, in their entirety.

TECHNICAL FIELD

The present disclosure generally relates to image matching, in particular, matching between a ground-view image and an aerial-view image.

BACKGROUND ART

A computer system that performs ground-to-aerial cross-view matching (matching between a ground-view image and an aerial-view image) has been developed. For example, NPL1 discloses a discriminator comprising a set of CNNs (Convolutional Neural Networks) for extracting features from a ground-view image and an aerial-view image to be compared with each other. Specifically, one of the CNNs acquires a ground-view image and orientation information corresponding thereto, and computes joint features from the mixed signal containing the ground-view image and the orientation information. The other one acquires an aerial-view image and orientation information corresponding thereto, and computes joint features from the mixed signal containing the aerial-view image and the orientation information. Then, whether the ground-view image matches the aerial-view image is determined based on the computed joint features.

In order to achieve precise ground-to-aerial cross-view matching, the discriminator is required to be trained with a lot of training datasets. Image augmentation is one of ways to increase the number of the training datasets. NPL2 discloses a technique to increase the number of the aerial-view images in which an augmented aerial-view image is generated by rotating an original one.

CITATION LIST

Non Patent Literature

NPL1: Liu Liu and Hongdong Li, "Lending Orientation to Neural Networks for Cross-view Geo-localization," Computer Research Repository, arXiv:1903.12351, Mar. 29, 2019
NPL2: Sijie Zhu and Taojiannan Yang and Chen Chen, "Revisiting Street-to-Aerial View Image Geo-localization and Orientation Estimation", Computer Research Repository, arXiv:2005.11592, May 23, 2020

SUMMARY OF INVENTION

Technical Problem

In NPL2, the augmented aerial-view image includes visible edges of the original aerial-view image. These visible edges can be leveraged to predict the original orientation. Thus, the discriminator could be trained to utilize the visible edges of the original aerial-view image in the augmented aerial-view image if the augmented aerial-view image is generated by the image augmentation method disclosed by NPL2, resulting in overfitting the augmented training data. NPL1 does not mention about image augmentation.

An objective of the present disclosure is to provide a technique to increase the number of the aerial-view images for training a discriminator while preventing the discriminator from overfitting the augmented training data.

Solution to Problem

The present disclosure provides an image augmentation apparatus comprising at least one processor and memory storing instructions. The at least one processor is configured to execute the instructions to: acquire an original training dataset including a ground-view image and an original aerial-view image; perform an image augmentation including a cropping process and a rotation process on the original aerial-view image to generate an augmented aerial-view image, the cropping process being of cropping a target region with a circle shape or a regular polygon shape from the original aerial-view image, the rotation process being of rotating the original aerial-view image, an angle of the rotation being a multiple of a center angle of the target region when the target region has a regular polygon shape; and output an augmented training dataset including the ground-view image and the augmented aerial-view image.

The present disclosure further provides a control method that is performed by a computer. The control method comprises: acquiring an original training dataset including a ground-view image and an original aerial-view image; performing an image augmentation including a cropping process and a rotation process on the original aerial-view image to generate an augmented aerial-view image, the cropping process being of cropping a target region with a circle shape or a regular polygon shape from the original aerial-view image, the rotation process being of rotating the original aerial-view image, an angle of the rotation being a multiple of a center angle of the target region when the target region has a regular polygon shape; and outputting an augmented training dataset including the ground-view image and the augmented aerial-view image.

The present disclosure further provides a non-transitory computer readable storage medium storing a program. The program that causes a computer to execute: acquiring an original training dataset including a ground-view image and an original aerial-view image; performing an image augmentation including a cropping process and a rotation process on the original aerial-view image to generate an augmented aerial-view image, the cropping process being of cropping a target region with a circle shape or a regular polygon shape from the original aerial-view image, the rotation process being of rotating the original aerial-view image, an angle of the rotation being a multiple of a center angle of the target region when the target region has a regular polygon shape; and outputting an augmented training dataset including the ground-view image and the augmented aerial-view image.

Advantageous Effects of Invention

According to the present disclosure, it is possible to provide a technique to increase the number of the aerial-view images for training a discriminator while preventing the discriminator from overfitting to the augmented training data.

DESCRIPTION OF EMBODIMENTS

Example embodiments according to the present disclosure will be described hereinafter with reference to the drawings. The same numeral signs are assigned to the same elements throughout the drawings, and redundant explanations are omitted as necessary.

First Example Embodiment

<Overview>

Figure 1:
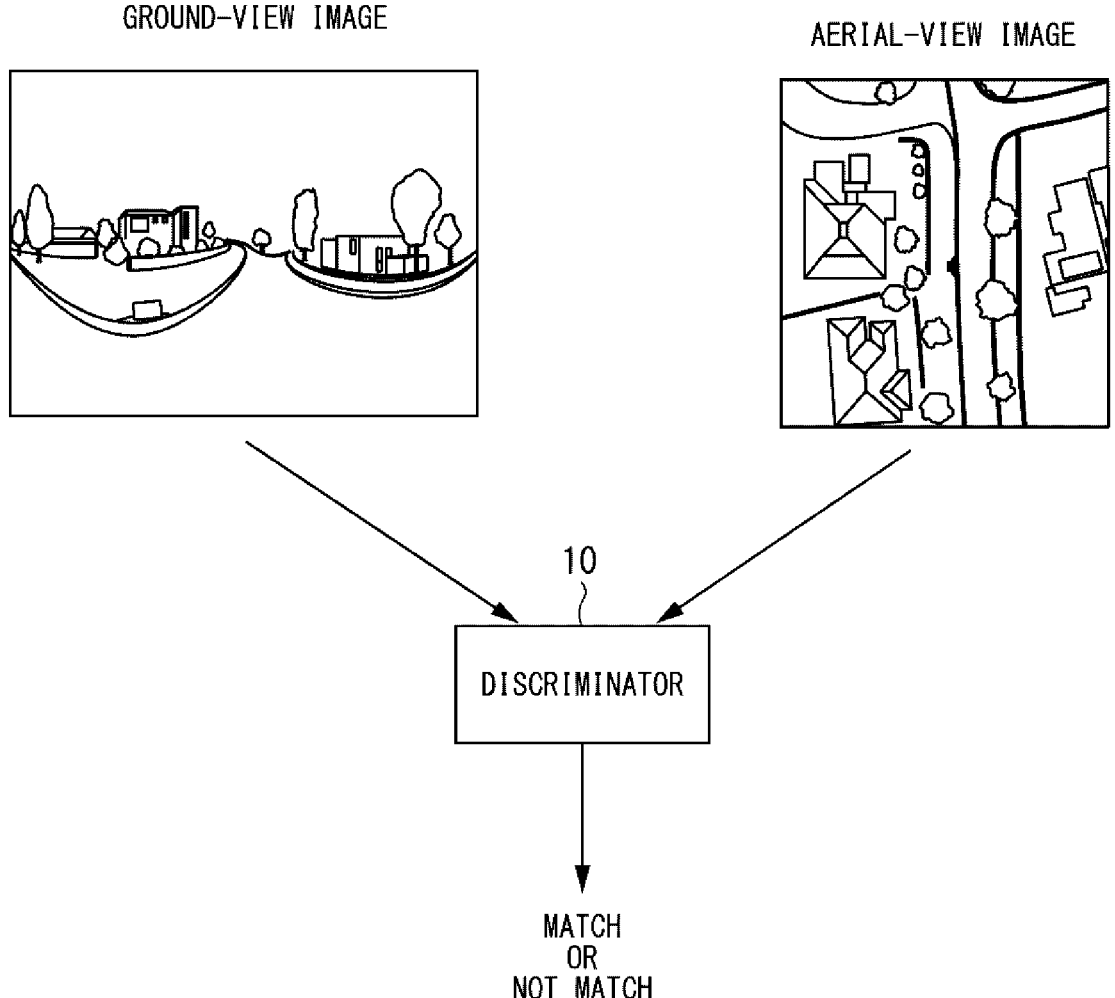
FIG. 1 illustrates a discriminator that is trained using the training data generated by an image augmentation apparatus of the 1st example embodiment.

An image augmentation apparatus of the 1st example embodiment generates a training dataset with which a discriminator is trained. FIG. 1 illustrates a discriminator that is trained using the training data generated by the image augmentation apparatus 2000 of the 1st example embodiment. The discriminator performs matching between a ground-view image and an aerial-view image (so-called ground-to-aerial cross-view matching). The ground-view image is an image including a ground view of a place. For example, the ground-view image is captured by pedestrians, cars, and etc. The ground-view image may be panoramic in nature (having a 360-degree field of view), or may have a limited (less than 360-degree) field of view. The aerial-view image is an image including a top view of a place. For example, the aerial-view image is captured by a drone, air plane, satellite, and etc. Specifically, the discriminator 10 acquires a ground-view image and an aerial-view image, and determines whether the acquired ground-view image matches the acquired aerial-view image. Note that "the ground-view image matches the aerial-view image" means that the location where the ground-view image is captured is included in the aerial-view image.

Figure 2:
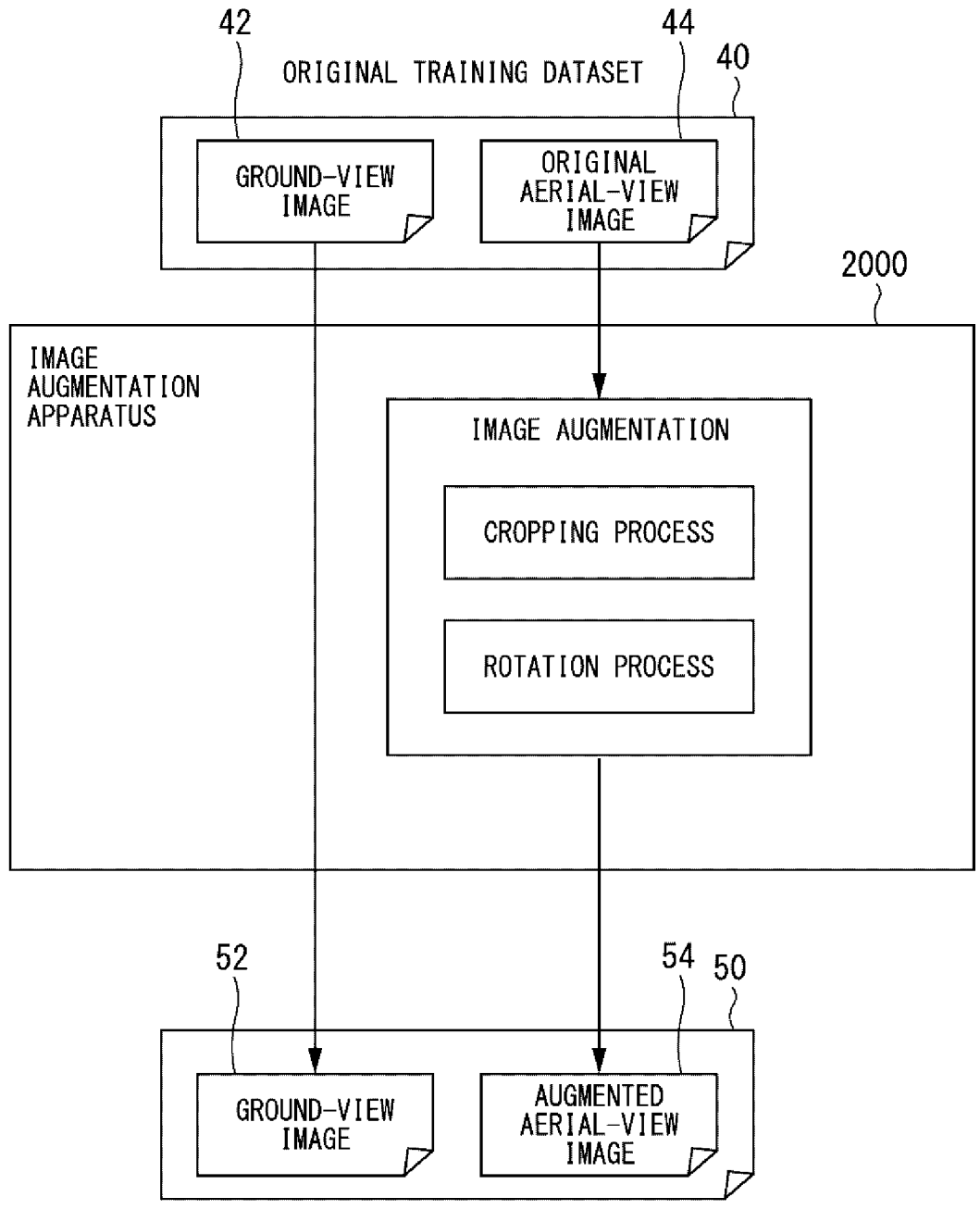
FIG. 2 illustrates an overview of the image augmentation apparatus of the 1st example embodiment.

FIG. 2 illustrates an overview of the image augmentation apparatus 2000 of the 1st example embodiment. The image augmentation apparatus 2000 receives an original training dataset 40 that includes a ground-view image 42 and an original aerial-view image 44. Next, the image augmentation apparatus 2000 performs an image augmentation on the original aerial-view image 44, thereby generating an augmented aerial-view image 54. Then, the image augmentation apparatus 2000 generates a new training dataset (hereinafter, augmented training dataset 50) that includes a ground-view image 52 and the augmented aerial-view image 54, and outputs the augmented training dataset 50. The ground-view image 52 is the same image as the ground-view image 42; the ground-view image 42 may be used as the ground-view image 52 as it is, or the ground-view image 52 is generated by copying the ground-view image 42. Through the image augmentation mentioned above, the image augmentation apparatus 2000 increases the number of training dataset for the training of the discriminator 10.

The image augmentation performed on the original aerial-view image 44 includes the following two processes: 1) a cropping process and 2) a rotation process. Note that these two processes are not performed in any particular order.

In the cropping process, the image augmentation apparatus 2000 crops a target region from the original aerial-view image 44. A shape of the target region should be a circle or a regular polygon, such as a square, regular pentagon, regular hexagon, etc. In the rotation process, the image augmentation apparatus 2000 rotates the original aerial-view image 44 by a certain angle. Hereinafter, an angle by which the original aerial-view image 44 is rotated to generate the augmented aerial-view image 54 is described as "a rotation angle". Note that in the case where the cropping process is performed before the rotation process, the image augmentation apparatus 2000 may rotate the target region of the original aerial-view image 44.

Figure 3:
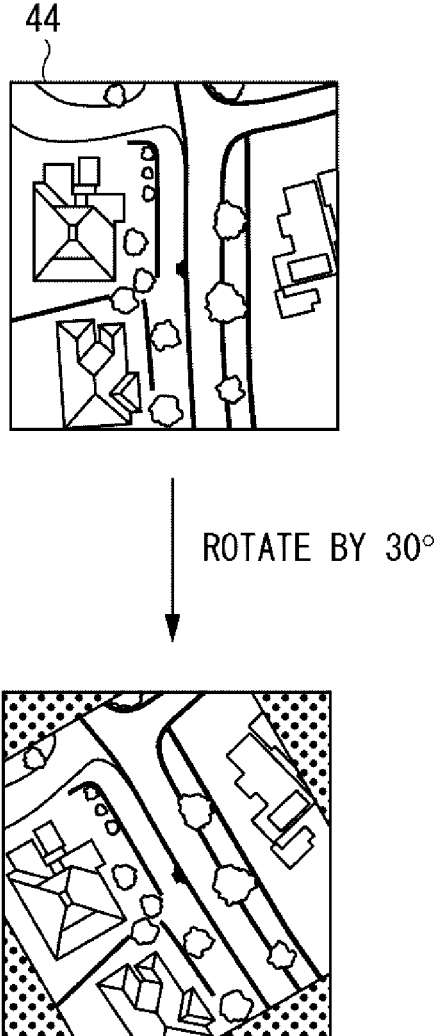
FIG. 3 illustrates a case where a new aerial-view image is generated by rotating the original aerial-view image without cropping.

The reason that the shape of the target region should be a circle or a regular polygon is to prevent the discriminator 10 from being trained to use edges of the original aerial-view image 44 visible in the augmented aerial-view image 54 to guess the original orientation (the orientation of the original aerial-view image 44). FIG. 3 illustrates a case where a new aerial-view image is generated by rotating the original aerial-view image 44 without cropping. In this case, the edges of the original aerial-view image 44 are included in the new aerial-view image. Thus, the original orientation can be predicted based on those edges.

Figure 4:
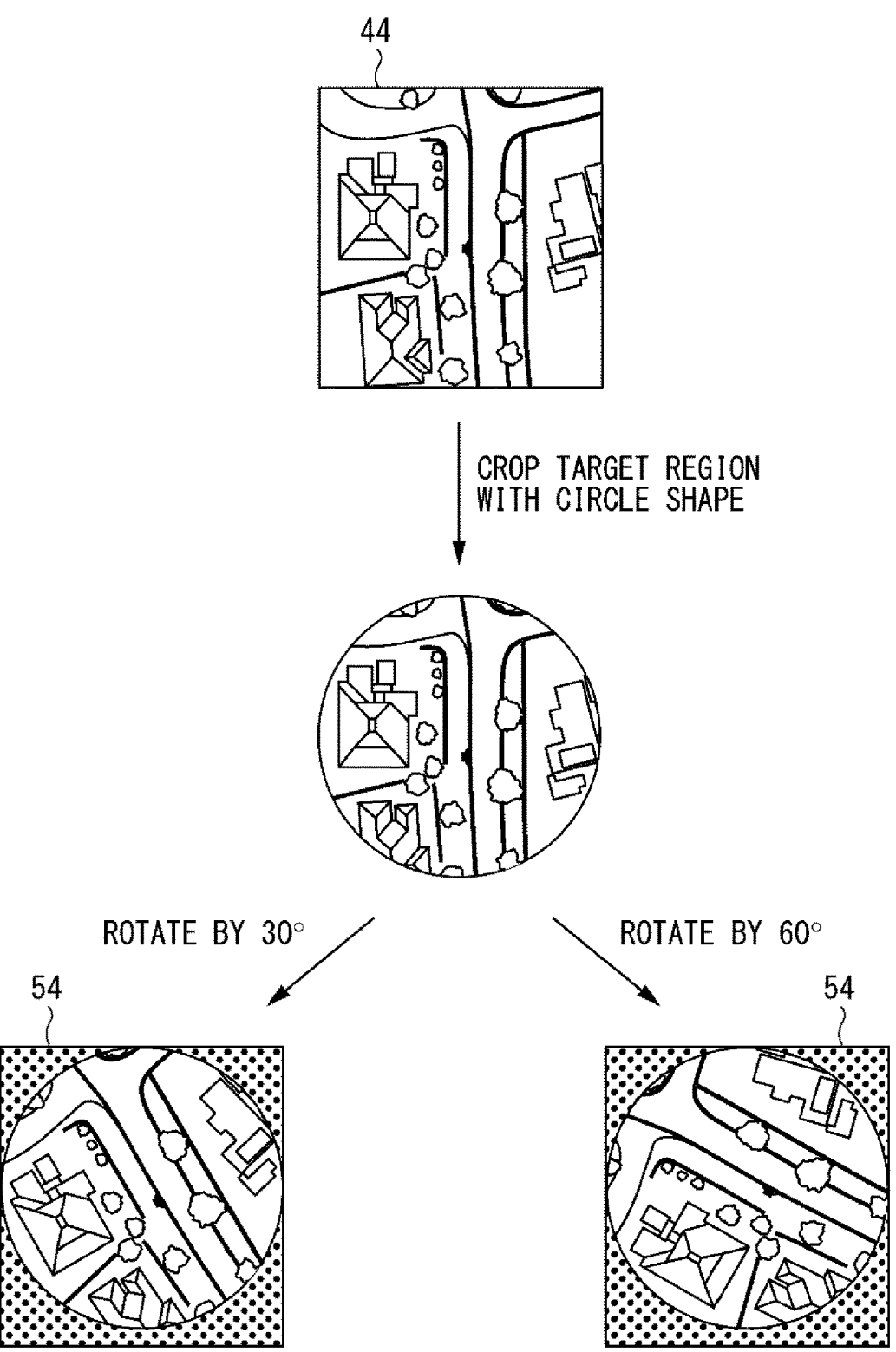
FIG. 4 illustrates a case where the augmented aerial-view image is generated by rotating the target region having a circle shape.

On the other hand, in the case where the augmented aerial-view image 54 is generated by rotating the target region with a circle shape, it is difficult for the discriminator 10 to guess the original orientation since the circle does not have edges. FIG. 4 illustrates a case where the augmented aerial-view image 54 is generated by rotating the target region having a circle shape. In this case, it is difficult to guess the original orientation regardless of the rotation angle. Thus, the image augmentation apparatus 2000 may rotate the target region with a circle shape by any angle.

In the case where the augmented aerial-view image 54 is generated by rotating the target region with a regular polygon shape, the rotation angle depends on the type of the regular polygon. Specifically, the rotation angle is a multiple of a center angle of the target region. For example, the rotation angle θ for the target region having N vertices (i.e. regular N-gon) has to satisfy the following equation:

Equation 1

$$\theta = \frac{360°}{N} * M \qquad (1)$$

$$(1 \le M < N, M \in \mathbb{Z})$$

where $\frac{360°}{M}$ represents the center angle of the target region.

Figure 5:
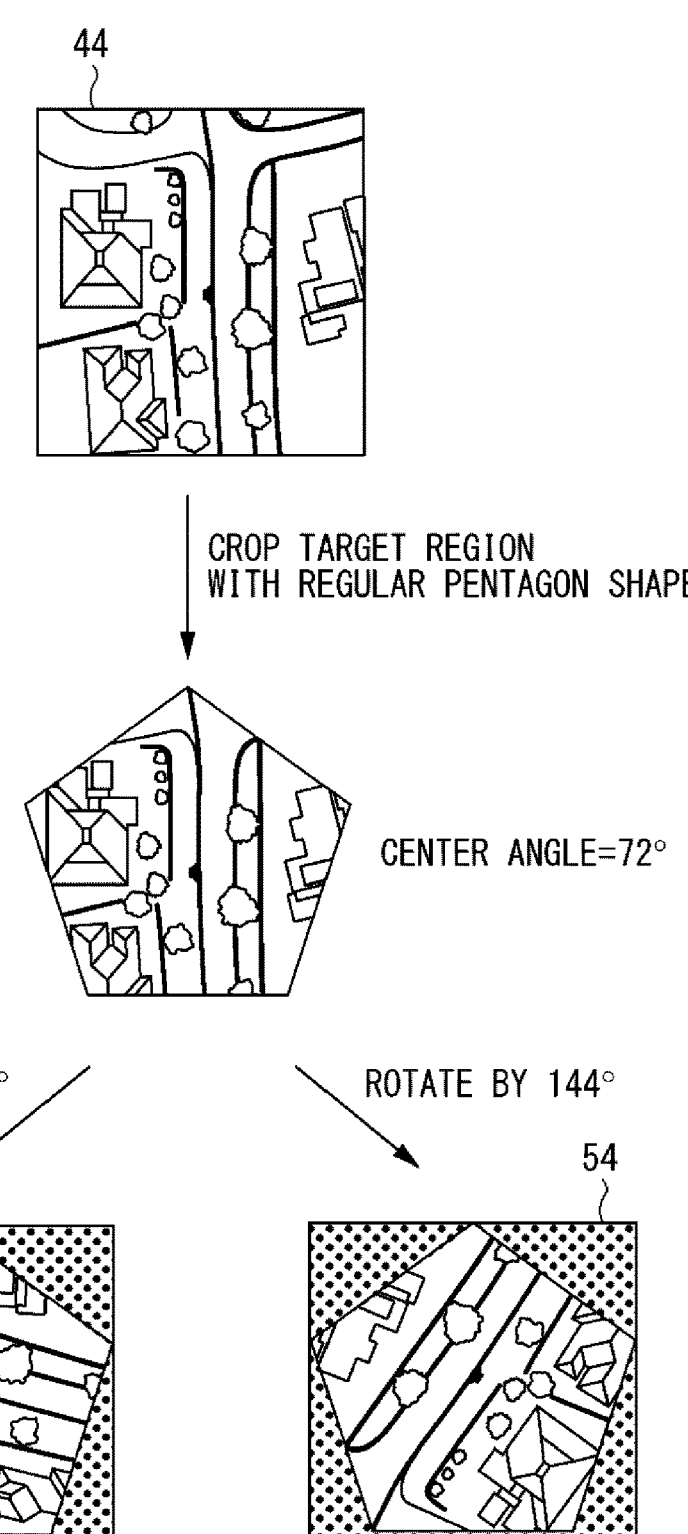
FIG. 5 illustrates a case where the augmented aerial-view image is generated by rotating the target region having a regular pentagon shape.

FIG. 5 illustrates a case where the augmented aerial-view image 54 is generated by rotating the target region having a regular pentagon shape. As seen in FIG. 5, the change in orientation of the aerial-view image cannot be recognized based on the edges of the original aerial-view image 44 visible in the augmented aerial-view image 54 when the rotation angle is a multiple of a center angle of the target region having a regular polygon. Thus, it is possible to prevent the discriminator 10 from being trained to use edges of the original aerial-view image 44 visible in the augmented aerial-view image 54 to guess the original orientation.

The image augmentation apparatus 2000 outputs the augmented training dataset 50 in such a manner that the augmented training dataset 50 can be used to train the discriminator 10. For example, the augmented training dataset 50 is put into a storage device that stores the training dataset to be used for the training of the discriminator 10.

<Example of Advantageous Effect>

According to the image augmentation apparatus 2000 of the 1st example embodiment, the augmented aerial-view image is generated through the cropping process and the rotation process. Since the target region having a circular shape or a regular polygon shape is cropped from the original aerial-view image 44, the augmented aerial-view image 54 does not include a clue which enables the original orientation to be guessed. Thus, the discriminator 10 can be prevented from overfitting to the augmented training data.

Hereinafter, more detailed explanation of the image augmentation apparatus 2000 will be described.

<Example of Functional Configuration>

Figure 6:
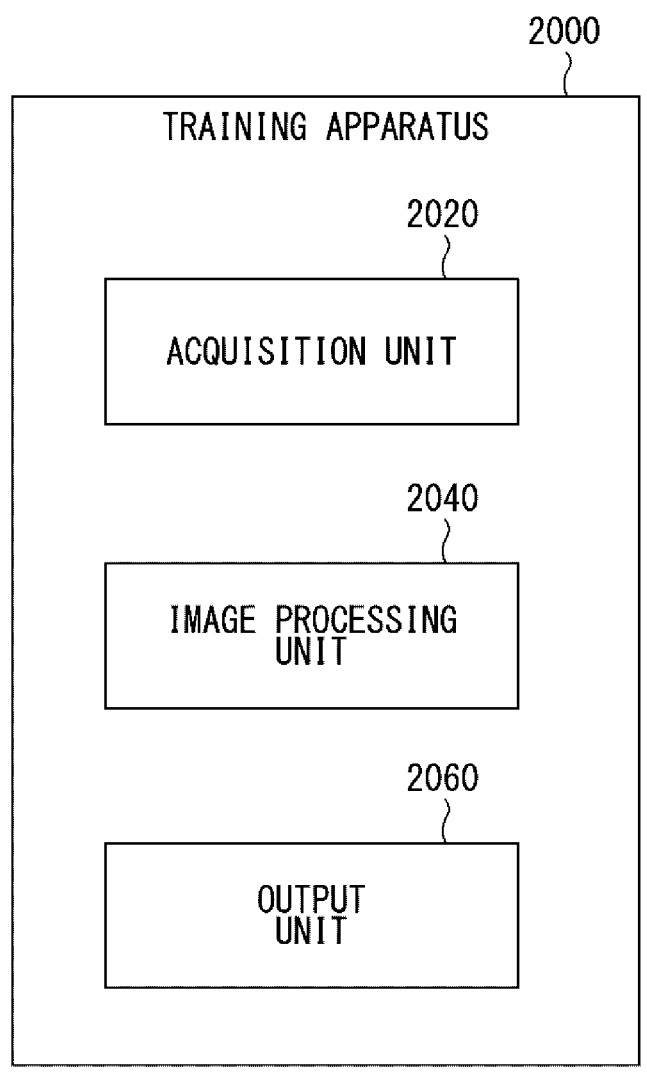
FIG. 6 is a block diagram illustrating an example of the functional configuration of the training apparatus of the 1st example embodiment.

FIG. 6 is a block diagram illustrating an example of the functional configuration of the image augmentation apparatus 2000 of the 1st example embodiment. The image augmentation apparatus 2000 includes an acquisition unit 2020, an image processing unit 2040, and an output unit 2060. The acquisition unit acquires the original dataset 40. The image processing unit 2040 performs the image augmentation process on the original aerial-view image 44. The image augmentation process includes 1) the cropping process where the target region having a circle shape or a regular polygon shape cropped from the original aerial-view image 44, and 2) the rotation process where the original aerial-view image 44 is rotated. In the case where the shape of the target region is a regular polygon, the rotation angle is a multiple of the center angle of the target region. The output unit 2060 outputs the augmented training dataset 50.

<Example of Hardware Configuration of Image Augmentation Apparatus 2000>

The image augmentation apparatus 2000 may be realized by one or more computers. Each of the one or more computers may be a special-purpose computer manufactured for implementing the image augmentation apparatus 2000, or may be a general-purpose computer like a personal computer (PC), a server machine, or a mobile device. The image augmentation apparatus 2000 may be realized by installing an application in the computer. The application is implemented with a program that causes the computer to function as the image augmentation apparatus 2000. In other words, the program is an implementation of the functional units of the image augmentation apparatus 2000.

Figure 7:
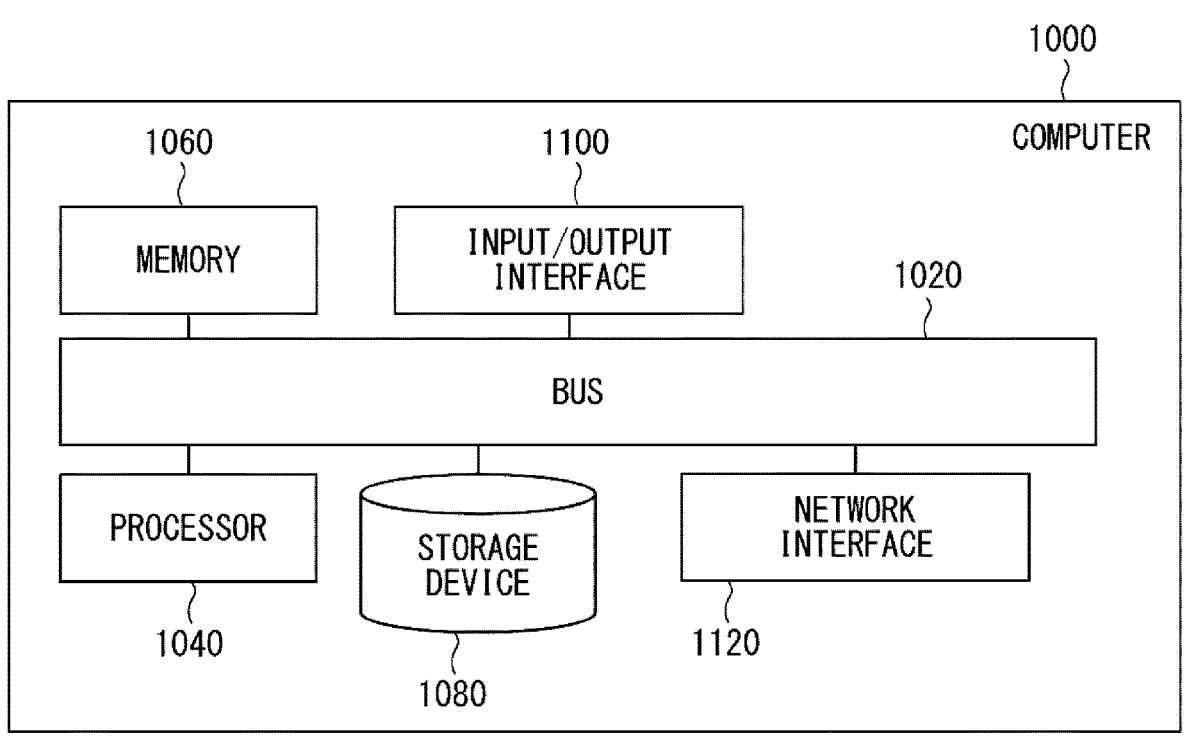
FIG. 7 is a block diagram illustrating an example of the hardware configuration of a computer realizing the training apparatus.

FIG. 7 is a block diagram illustrating an example of the hardware configuration of a computer 1000 realizing the image augmentation apparatus 2000. In FIG. 4, the computer 1000 includes a bus 1020, a processor 1040, a memory 1060, a storage device 1080, an input/output interface 1100, and a network interface 1120.

The bus 1020 is a data transmission channel in order for the processor 1040, the memory 1060, the storage device 1080, and the input/output interface 1100, and the network interface 1120 to mutually transmit and receive data. The processor 1040 is a processer, such as a CPU (Central Processing Unit), GPU (Graphics Processing Unit), or FPGA (Field-Programmable Gate Array). The memory 1060 is a primary memory component, such as a RAM (Random Access Memory) or a ROM (Read Only Memory). The storage device 1080 is a secondary memory component, such as a hard disk, an SSD (Solid State Drive), or a memory card. The input/output interface 1100 is an interface between the computer 1000 and peripheral devices, such as a keyboard, mouse, or display device. The network interface 1120 is an interface between the computer 1000 and a network. The network may be a LAN (Local Area Network) or a WAN (Wide Area Network).

The storage device 1080 may store the program mentioned above. The CPU 1040 executes the program to realize each functional unit of the image augmentation apparatus 2000. In addition, the storage device 1080 may store the original training dataset 40.

The hardware configuration of the computer 1000 is not limited to the configuration shown in FIG. 7. For example, as mentioned-above, the image augmentation apparatus 2000 may be realized by plural computers. In this case, those computers may be connected with each other through the network.

<Flow of Process>

Figure 8:
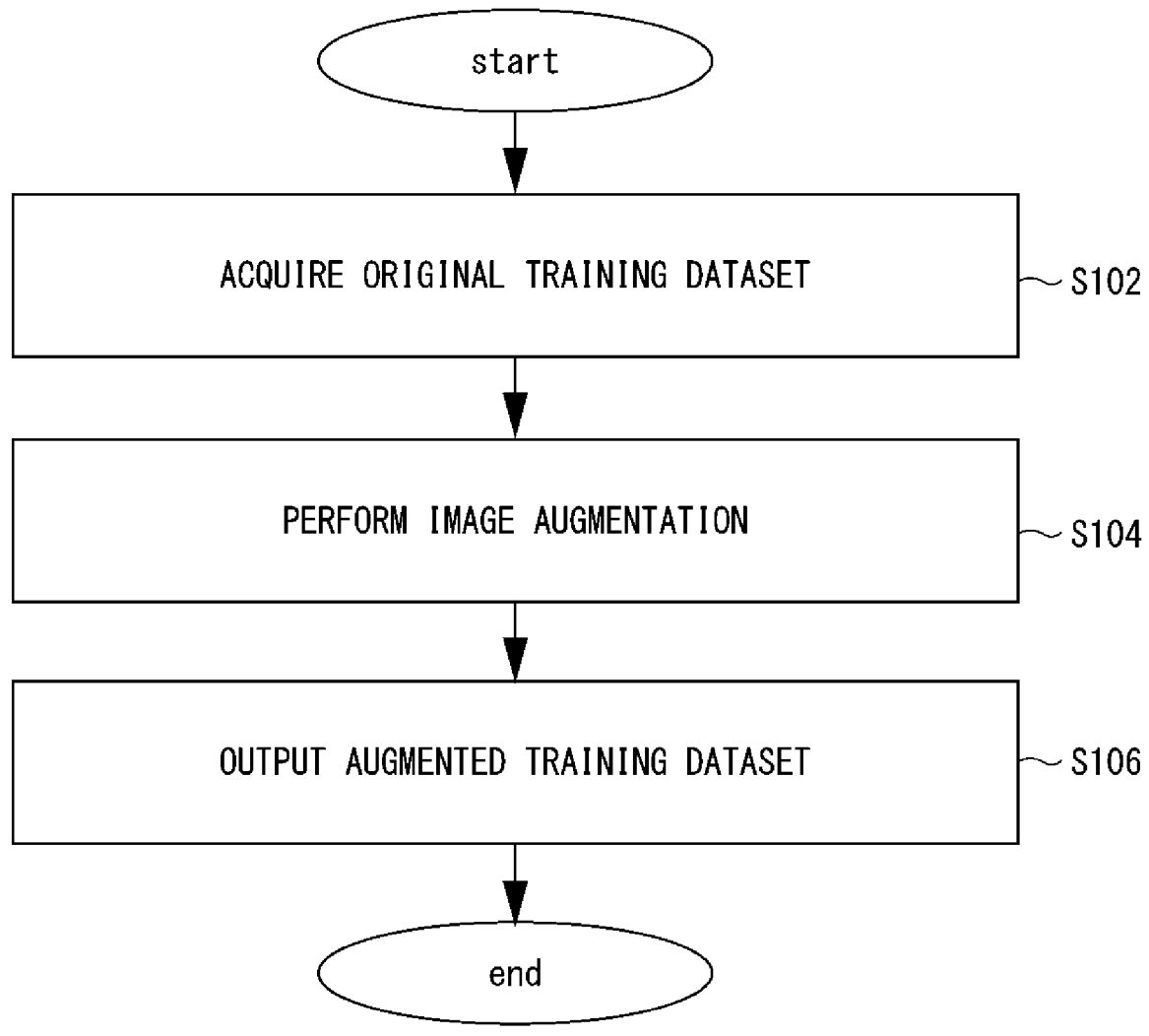
FIG. 8 is a flowchart illustrating an example flow of processes that the training apparatus of the 1st example embodiment performs.

FIG. 8 is a flowchart illustrating an example flow of processes that the image augmentation apparatus 2000 of the 1st example embodiment performs. The acquisition unit 2020 acquires the original training dataset 40 (S102). The image processing unit 2040 performs an image augmentation on the original aerial-view image 44 to generate the augmented aerial-view image 54 (S104). The output unit 2060 outputs the augmented training dataset 50 (S106).

Figure 9:
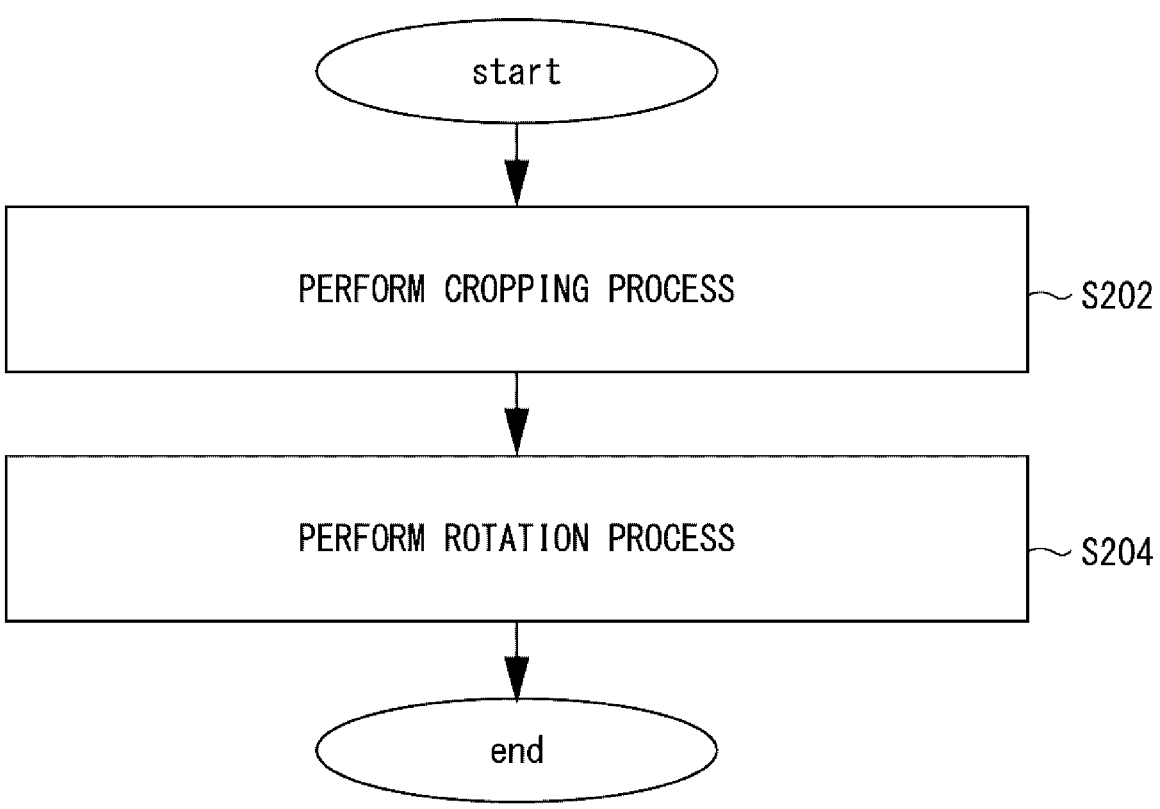
FIG. 9 is a flowchart illustrating an example flow of image augmentation performed by the image processing unit.

FIG. 9 is a flowchart illustrating an example flow of the image augmentation performed by the image processing unit 2040. The image processing unit 2040 performs the cropping process on the original aerial-view image 44 to obtain the target region (S202). The image processing unit 2040 performs the rotation process on the target region (S204). As a result of the above two steps, the rotated target region can be obtained as the augmented aerial-view image 54. Note that the cropping process is performed after the rotation process, as mentioned above. In addition, as described in detail later, some post-processing may be performed after the cropping process and the rotation process.

<Details of Discriminator 10>

The discriminator 10 acquires a ground-view image and an aerial-view image, and determines whether the ground-view image matches the aerial-view image. This determination may be realized in various ways. For example, the discriminator 10 extract features of the ground-view image and features of the aerial-view image, and calculate degree of similarity between the features of the ground-view image and the features of the aerial-view image. If the calculated degree of similarity is high (for example, greater than or equal to a pre-defined threshold), it is determined that the ground-view image matches the aerial-view image. On the other hand, if the calculated degree of similarity is low (for example, less than the pre-defined threshold), it is determined that the ground-view image does not match the aerial-view image.

There may be various implementations of the discriminator 10. For example, the discriminator 10 may be configured with one or more neural networks. The Siamese network disclosed by NPL1 may be used as an example of a concrete implementation of the discriminator 10.

Figure 10:
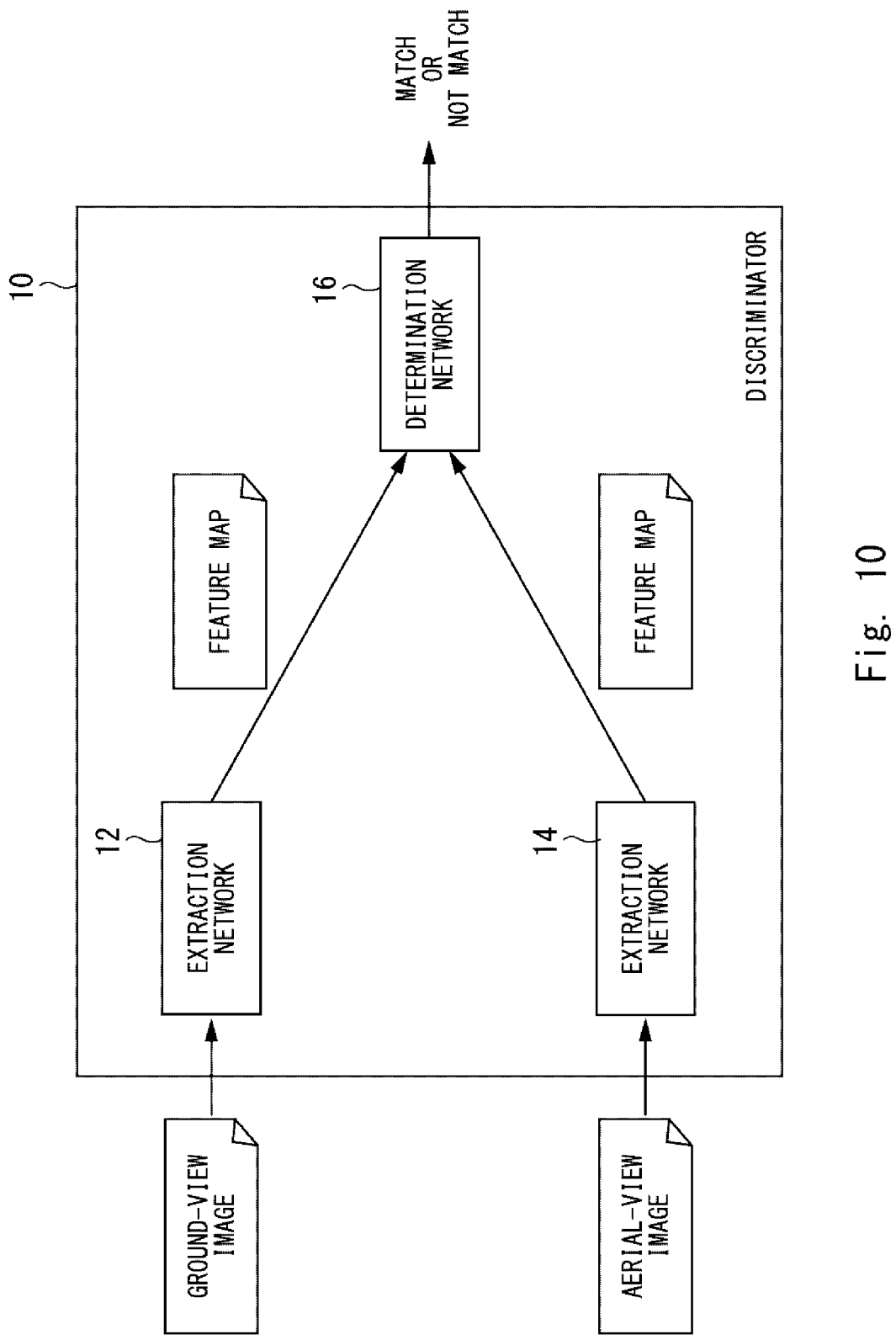
FIG. 10 illustrates a basic structure of the discriminator that is implemented with neural networks.

FIG. 10 illustrates a basic structure of the discriminator 10 that is implemented with neural networks. The discriminator 10 includes an extraction network 12, a second extraction network 14, and a determination network 16. The extraction network 12 is a neural network that acquires a ground-view image, generates one or more feature maps of the ground-view image (i.e. extracts features of the ground-view image), and outputs the generated feature maps. The extraction network 14 is a neural network that acquires an aerial-view image, generates one or more feature maps of the aerial-view image (i.e. extracts features of the aerial-view image), and outputs the generated feature maps.

The feature maps of the ground-view image and those of the aerial-view image are fed into the determination network 16. The determination network 16 analyzes the fed feature maps, and outputs data (e.g. flag) that represents whether or not the ground-view image matches the aerial-view image.

<<Example Application of Discriminator 10>>

There are various applications of the discriminator 10. For example, the discriminator 10 can be used as a part of a system (hereinafter, a geo-localization system) that performs image geo-localization. Image geo-localization is a technique to determine the place at which an input image is captured. Note that, the geo-localization system is merely an example of the application of the discriminator 10, and the application of the discriminator 10 is not limited to being used in the geo-localization system.

Figure 11:
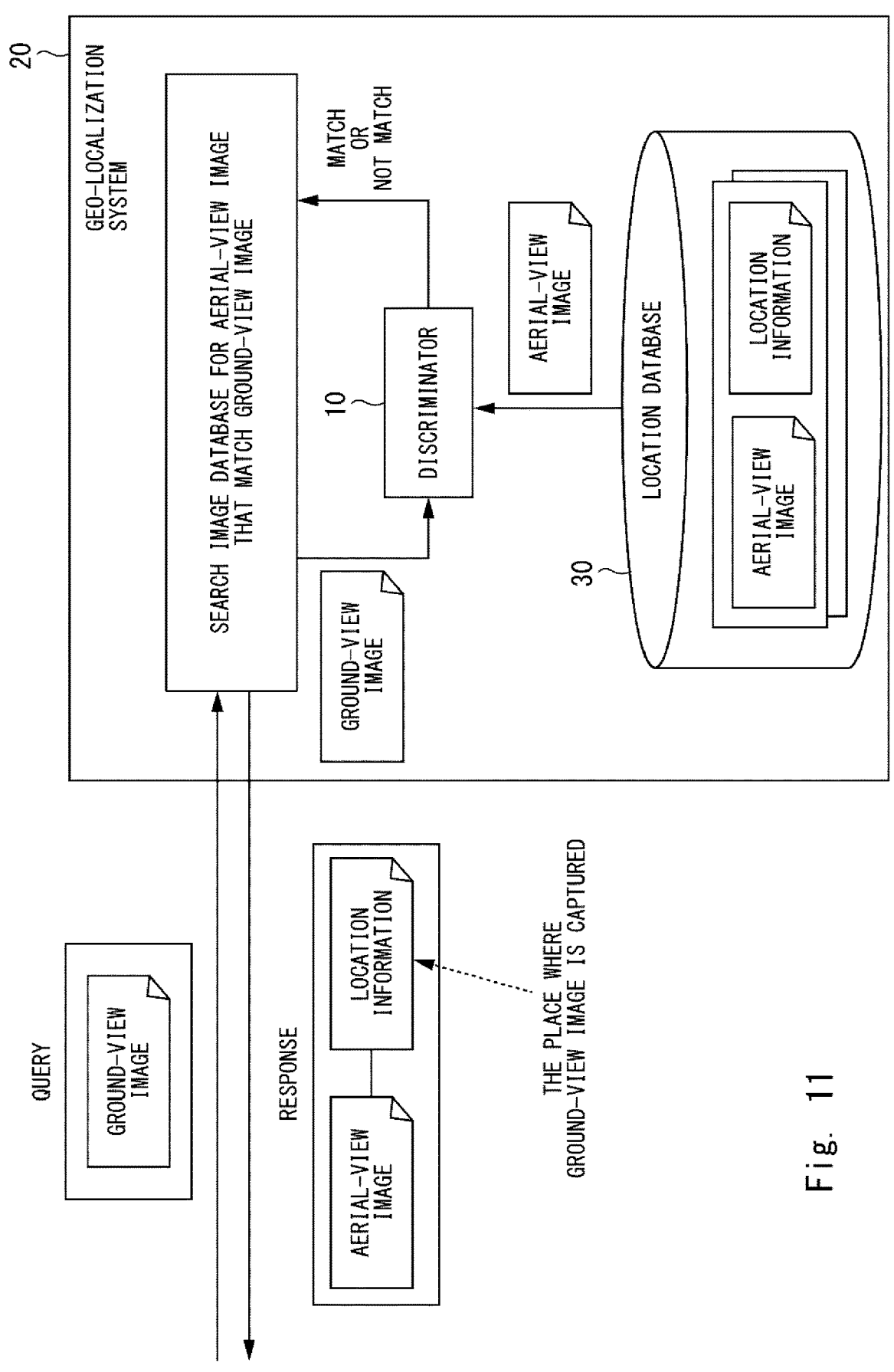
FIG. 11 illustrates a geo-localization system that includes the discriminator.

FIG. 11 illustrates a geo-localization system 20 that includes the discriminator 10. The geo-localization system 20 includes the discriminator 10 and the location database 30. The location database 30 includes a plurality of aerial-view images to each of which location information is attached. An example of the location information may be a GPS (Global Positioning System) coordinate of the place captured in the corresponding aerial-view image.

The geo-localization system 20 receives a query that includes a ground-view image from a client (e.g. user terminal), and searches the location database for the aerial-view image that matches the ground-view image in the received query, thereby determining the place at which the ground-view image is captured. Specifically, until the aerial-view image that matches the ground-view image in the query is detected, the geo-localization system 20 repeatedly executes to: acquire one of the aerial-view images from the location database 30; input the ground-view image and the acquired aerial-view image into the discriminator 10; and determine whether the output of the discriminator 10 indicates that the ground-view image matches the aerial-view image. By doing so, the geo-localization system 20 can find the aerial-view image that includes the place at which the ground-view image is captured. Since the detected aerial-view image is associated with the location information such as the GPS coordinate, the geo-localization system 20 can recognize that where the ground-view image is captured is the place that is indicated by the location information associated with the aerial-view image that matches the ground-view image.

Note that the geo-localization system 20 may be implemented by one or more arbitrary computers such as ones depicted in FIG. 7.

<Acquisition of Training Data: S102>

The acquisition unit 2020 acquires the original training dataset 40 (S102). As described above, the original training dataset includes the ground-view image 42 and the original aerial-view image 44. Hereinafter, examples of ways to acquire the training dataset will be explained.

The original training dataset may be a positive example or a negative example: the former is a dataset in which the ground-view image 42 matches the original aerial-view image 44; the latter is a dataset in which the ground-view image 42 does not match the original aerial-view image 44.

For example, the acquisition unit 2020 acquires a ground-view image and an aerial-view image from a storage device (hereinafter, an image storage device) to which the acquisition unit 2020 has access, and generates an original training dataset 40 that includes the acquired ground-view image and the acquired aerial-view image. For example, the image storage device stores plural ground-view images and aerial-view images in advance. Each image in the image storage device is associated with location information of the place at which that image is captured. As described above, the GPS coordinate is an example of the location information.

The image augmentation apparatus 2000 acquires an arbitrary ground-view image from the image storage device. In the case where the acquisition unit 2020 generates a positive example, the acquisition unit 2020 acquires an aerial-view image whose location information represents the same location as or a location very close to the location represented by the location information of the acquired ground-view image. Note that "a location is very close to another location" means that the distance between these locations (e.g. GPS coordinates) is less than or equal to a predefined threshold. Then, the acquisition unit 2020 generates an original training dataset 40 that includes the acquired ground-view image and the acquired aerial-view image.

On the other hand, in the case where the acquisition unit 2020 generates a negative example, the acquisition unit 2020 acquires an aerial-view image whose location information represents a location different from the location represented by the ground-view image. Note that "a location is different from another location" means that their locations (e.g. GPS coordinates) are not equal to each other, or that the distance between these locations is greater than the predefined threshold. Then, the acquisition unit 2020 generates an original training dataset 40 that includes the acquired ground-view image, the acquired aerial-view image, and information (e.g. flag) indicating that the ground-view image matches the aerial-view image.

The acquisition unit 2020 may generate the original training dataset 40 for each possible pair of the ground-view image and the aerial-view image stored in the image storage device. Then, the augmented training dataset 50 is generated for each of the original training datasets 40 acquired. However, the acquisition unit 2020 does not necessarily use all of the images stored in the image storage device.

Note that, in order to enable it to be recognized whether the original training dataset 40 is a positive example or a negative one, it is preferable that a label that indicates whether or not the ground-view image 42 matches the aerial-view image 44 is also included in the original training dataset 40.

The acquisition unit 2020 does not necessarily generate the original training dataset 40, and original training datasets may be prepared in advance in the image storage device. In this case, the acquisition unit 2020 acquires one or more of the original training datasets 40 from the image storage device. Then, the augmented training dataset 50 is generated for each of the original training datasets 40 acquired.

<Cropping Process: S202>

The image processing unit 2040 crops a target region from the original aerial-view image 44 (S202). The shape of the target region may be defined in advance. For example, the image processing unit 2040 acquires shape information that specifies the shape of the target region, and crops the target region with the shape specified by the shape information from the original aerial-view image 44. Note that it is preferable for the image processing unit 2040 to crop the largest region that is within the original aerial-view image 44 and has the specified shape as the target region, thereby utilizing as many features in the original aerial-view image 44 as possible to train the discriminator 10.

The shape information may specify multiple shapes. In this case, the image processing unit 2040 crops a target region for each of the shapes specified by the shape information. For example, if the shape information indicates "circle" and "regular pentagon", the image processing unit 2040 crops, from the original aerial-view image 44, a target region with a circle shape and a target region with a pentagon shape.

<Rotation Process: S204>

The image processing unit 2040 performs the rotation process (S204). Hereinafter, the rotation process is explained in more detail in the case where the shape of the target region is a circle and in the case where it is a regular polygon.

<<Target Region with Circle Shape>>

In the case where the shape of the target region is a circle, the image processing unit 2040 may rotate the target region by an arbitrary angle. For example, the image processing unit 2040 obtains a random angle larger than 0 and less than 360, and rotates the target region by that random angle; in other words, a random number larger than 0 and less 360 is used as the rotation angle. In another example, the image processing unit 2040 acquires information (hereinafter, angle information) that specifies the rotation angle. In this case, the image processing unit 2040 rotates the target region by the rotation angle specified by the angle information.

The image processing unit 2040 may use a single target region to generate a multiple augmented aerial-view image 54 whose rotation angles are different from each other. For example, the image processing unit 2040 may generate the augmented aerial-view image A1, A2, and A3 by rotating the target region by 90°, 180°, and 270°, respectively. When the image processing unit 2040 uses random angles, the image processing unit 2040 may acquire information that specifies the number of the augmented aerial-view images 44 to be generated, obtain the specified number of random angles, and generate the augmented aerial-view images 54 based on each of the obtained random angles. On the other hand, when the image processing unit 2040 uses the angle information, the image processing unit 2040 may acquire the angle information that specifies the multiple rotation angles, and generate the augmented aerial-view image 54 for each of the specified rotation angles.

<<Target Region with Regular Polygon Shape>>

In the case where the shape of the target region is a regular polygon, the rotation angle satisfies Equation (1). For example, the image processing unit 2040 obtains a random integer r and inputs r to M of Equation (1), thereby obtaining the rotation angle θ, where r is larger than or equal to 1 and less than the number of vertices of the target region. Then, the image processing unit 2040 rotates the target region by the obtained rotation angle θ. In another example, the image processing unit 2040 acquires the angle information that specifies the rotation angle. The angle information is created to specify the rotation angle that satisfies Equation (1) in advance.

As described above, the image processing unit 2040 may use a single target region to generate the multiple augmented aerial-view image 54 whose rotation angles are different from each other. When the image processing unit 2040 uses random numbers, the image processing unit 2040 may acquire information that specifies the number of the augmented aerial-view images 54 to be generated, obtain the specified number of random numbers each of which is larger than or equal to 1 and less than the number of vertices of the target region, and input each of the random numbers to Equation (1), thereby obtaining the specified number of the rotation angles. When the image processing unit 2040 uses the angle information, the image processing unit 2040 may acquire the angle information that specifies multiple angles each of which satisfies Equation (1).

<Post-Processing>

The image processing unit 2040 may perform some post-processing after the cropping process and the rotation process to generate the augmented aerial-view image 54. For example, the image processing unit 2040 may perform a padding process on the rotated target region to generate the augmented aerial-view image 54 that has the same number of pixels as the original aerial-view image 44. For example, in FIGS. 3-6, a part of the aerial-view image whose pixels are discarded as a result of the cropping process and the rotation process is filled with black pixels. Note that, for ease of illustration, FIGS. 3-6 indicates areas filled with black pixels by dot patterns. Furthermore, a color of pixels with which the part of the aerial-view image whose pixels are discarded is filled is not limited to black.

Figure 12:
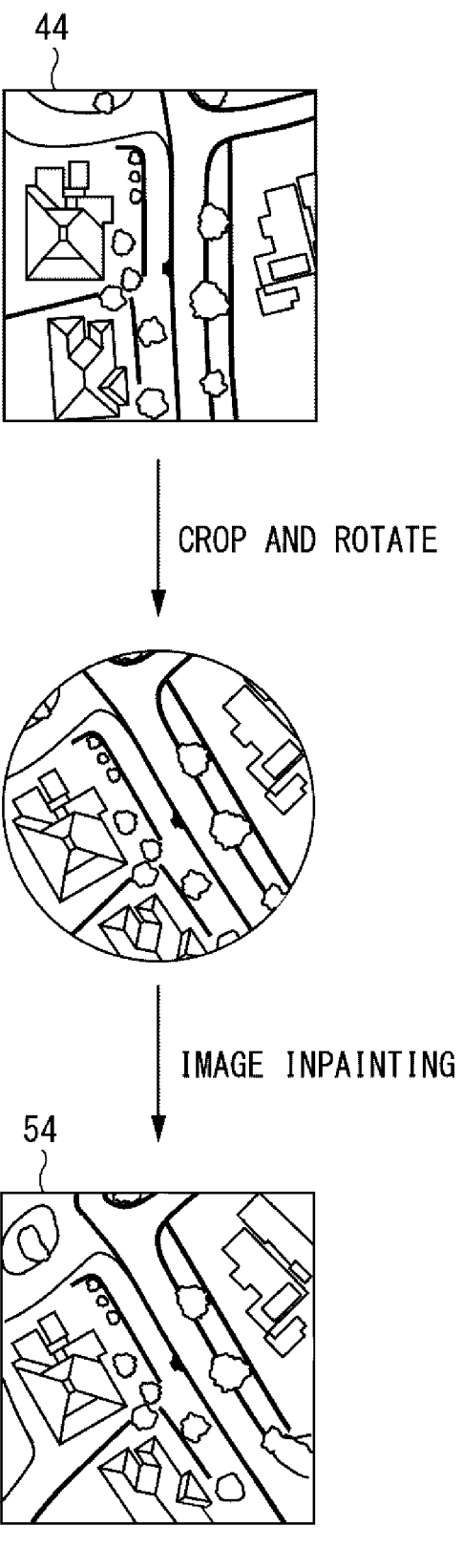
FIG. 12 illustrates an image inpainting to generate the augmented aerial-view image.

In the case where the negative example is generated, the image processing unit 2040 may perform an image inpainting instead of the padding process mentioned above to generate the augmented aerial-view image 54 that has the same number of pixels as that of the original aerial-view image 44. FIG. 12 illustrates an image inpainting to generate the augmented aerial-view image 54. In this case, the image processing unit 2040 generates the surrounding parts of the rotated target region through an image inpainting process.

<Output of Augmented Training Dataset: S106>

The image augmentation apparatus 2000 may output the augmented training dataset 50 (S106). When the output unit 2060 generates the augmented training dataset 50 from the original training dataset 40 of the positive example, the output unit 2060 generates the augmented training dataset 50 including the ground-view image 42, the augmented aerial-view image 54, and the label indicating that the ground-view image matches the augmented aerial-view image 54. On the other hand, when the output unit 2060 generates the augmented training dataset 50 from the original training dataset 40 of the negative example, the output unit 2060 generates the augmented training dataset 50 including the ground-view image 42, the augmented aerial-view image 54, and the label indicating that the ground-view image does not match the augmented aerial-view image 54. Note that, in the case where multiple augmented aerial-view images 26 are generated, the output unit 2060 generates the augmented training dataset 50 for each of the multiple augmented aerial-view image 54.

The augmented training dataset 50 may be output in an arbitrary manner. For example, the output unit 2060 may put the augmented training dataset 50 into a storage device, or send the augmented training dataset 50 to an apparatus that trains the discriminator 10.

<Additional Features>

Figure 13:
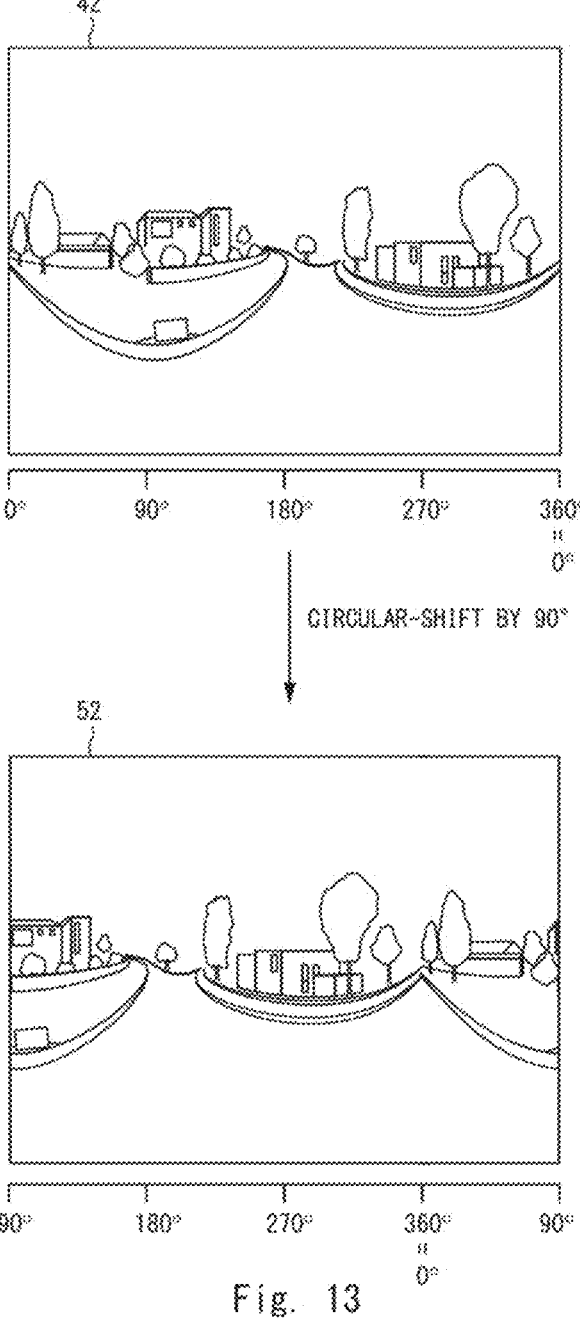
FIG. 13 illustrates a circular-shift performed on the ground-view image.

The image processing unit 2040 may perform image processing not only on the original aerial-view image 44, but also on the ground-view image 42. For example, the image processing unit 2060 may perform a circular-shift process on the ground-view image 42 in the case where the ground-view image 42 has a 360-degree field of view. FIG. 13 illustrates a circular-shift performed on the ground-view image. In this case, the image processing unit 2060 circular-shifts the ground-view image 42 by 90° to the left, thereby generating the augmented ground-view image 52 whose orientation is different from that of the original ground-view image 42.

Whether or not the angle of the circular-shift has to be the same as the rotation angle of the rotation process may depend on the type of ground-to-aerial cross-view matching to be performed by the discriminator 10. Specifically, the ground-to-aerial cross-view matching can be classified into two types. In the first type of the ground-to-aerial cross-view matching, the ground-view image and the aerial-view image are determined to match each other only when their locations and orientations are the same as each other. In the second type of the ground-to-aerial cross-view matching, the ground-view image and the aerial-view image are determined to match each other when their locations are the same as each other regardless of their orientations.

When the discriminator 10 is to be trained to perform the first type of the ground-to-aerial cross-view matching, the training dataset of the positive example must include the ground-view image and the aerial-view image whose orientations are the same as each other. Thus, the angle of the circular shift has to be the same as the rotation angle of the rotation process when the training dataset of the positive example is being generated. On the other hand, when the discriminator 10 is to be trained to perform the second type of the ground-to-aerial cross-view matching, the training dataset of the positive example is allowed to include the ground-view image whose orientation is different from that of the aerial-view image. Thus, the angle of the circular shift is not necessarily the same as the rotation angle of the rotation process even when the training dataset of the positive example is being generated.

The program can be stored and provided to a computer using any type of non-transitory computer readable media. Non-transitory computer readable media include any type of tangible storage media. Examples of non-transitory computer readable media include magnetic storage media (such as floppy disks, magnetic tapes, hard disk drives, etc.), optical magnetic storage media (e.g. magneto-optical disks), CD-ROM (compact disc read only memory), CD-R (compact disc recordable), CD-R/W (compact disc rewritable), and semiconductor memories (such as mask ROM, PROM (programmable ROM), EPROM (erasable PROM), flash ROM, RAM (random access memory), etc.). The program may be provided to a computer using any type of transitory computer readable media. Examples of transitory computer readable media include electric signals, optical signals, and electromagnetic waves. Transitory computer readable media can provide the program to a computer via a wired communication line (e.g. electric wires, and optical fibers) or a wireless communication line.

Although the present disclosure is explained above with reference to example embodiments, the present disclosure is not limited to the above-described example embodiments. Various modifications that can be understood by those skilled in the art can be made to the configuration and details of the present disclosure within the scope of the invention.

The whole or part of the example embodiments disclosed above can be described as, but not limited to, the following supplementary notes.

<Supplementary Notes>

(Supplementary Note 1)

An image augmentation apparatus comprising:

at least one processor; and memory storing instructions, wherein the at least one processor is configured to execute the instructions to:

acquire an original training dataset including a ground-view image and an original aerial-view image;

perform an image augmentation including a cropping process and a rotation process on the original aerial-view image to generate an augmented aerial-view image, the cropping process being one by which a target region with a circle shape or a regular polygon shape is cropped from the original aerial-view image, the rotation process being one by which the original aerial-view image is rotated, an angle of the rotation being a multiple of a center angle of the target region when the target region has a regular polygon shape; and output an augmented training dataset including the ground-view image and the augmented aerial-view image.

(Supplementary Note 2)

The image augmentation apparatus according to supplementary note 1, wherein the image augmentation further includes generating a plurality of the augmented aerial-view images by cropping a plurality of target regions whose shapes are different from each other, and the outputting of the augmented training dataset further includes outputting a plurality of the augmented training datasets whose augmented aerial-view images are different from each other.

(Supplementary Note 3)

The image augmentation apparatus according to supplementary note 1 or 2, wherein the image augmentation further includes to generating a plurality of the augmented aerial-view images whose angles of rotation are different from each other, and the outputting of the augmented training dataset includes outputting a plurality of the augmented training datasets whose augmented aerial-view images are different from each other.

(Supplementary Note 4)

The image augmentation apparatus according to any one of supplementary notes 1 to 3, wherein the image augmentation further includes generating the augmented aerial-view image having a same size as the original aerial-view image by compensating for discarded pixels through an image inpainting after the cropping process and the rotation process.

13 14

(Supplementary Note 5)

The image augmentation apparatus according to any one of supplementary notes 1 to 4, wherein the image augmentation further includes to perform a circular-shift on the original ground-view image to generate an augmented ground-view image, and the augmented training dataset includes the augmented ground-view image and the augmented aerial-view image.

(Supplementary Note 6)

A control method performed by a computer, comprising:

acquiring an original training dataset including a ground-view image and an original aerial-view image;

performing an image augmentation including a cropping process and a rotation process on the original aerial-view image to generate an augmented aerial-view image, the cropping process being one by which a target region with a circle shape or a regular polygon shape is cropped from the original aerial-view image, the rotation process being one by which the original aerial-view image is rotated, an angle of the rotation being a multiple of a center angle of the target region when the target region has a regular polygon shape; and outputting an augmented training dataset including the ground-view image and the augmented aerial-view image.

(Supplementary Note 7)

The control method according to supplementary note 6, wherein the image augmentation further includes generating a plurality of the augmented aerial-view images by cropping a plurality of target regions whose shapes are different from each other, and the outputting of the augmented training dataset further includes outputting a plurality of the augmented training datasets whose augmented aerial-view images are different from each other.

(Supplementary Note 8)

The control method according to supplementary note 6 or 7, wherein the image augmentation further includes generating a plurality of the augmented aerial-view images whose angles of rotation are different from each other, and the outputting of the augmented training dataset includes outputting a plurality of the augmented training datasets whose augmented aerial-view images are different from each other.

(Supplementary Note 9)

The control method according to any one of supplementary notes 6 to 8, wherein the image augmentation further includes generating the augmented aerial-view image having a same size as the original aerial-view image by compensating for discarded pixels through an image inpainting after the cropping process and the rotation process.

(Supplementary Note 10)

The control method according to any one of supplementary notes 6 to 9, wherein the image augmentation further includes performing a circular-shift on the original ground-view image to generate an augmented ground-view image, and the augmented training dataset includes the augmented ground-view image and the augmented aerial-view image.

(Supplementary Note 11)

A non-transitory computer-readable storage medium storing a program that causes a computer to execute to:

acquire an original training dataset including a ground-view image and an original aerial-view image;

perform an image augmentation including a cropping process and a rotation process on the original aerial-view image to generate an augmented aerial-view image, the cropping process being one by which a target region with a circle shape or a regular polygon shape is cropped from the original aerial-view image, the rotation process being one by which the original aerial-view image is rotated, an angle of the rotation being a multiple of a center angle of the target region when the target region has a regular polygon shape; and output an augmented training dataset including the ground-view image and the augmented aerial-view image.

(Supplementary Note 12)

The storage medium according to supplementary note 11, wherein the image augmentation further includes generating a plurality of the augmented aerial-view images by cropping a plurality of target regions whose shapes are different from each other, and the outputting of the augmented training dataset further includes outputting a plurality of the augmented training datasets whose augmented aerial-view images are different from each other.

(Supplementary Note 13)

The storage medium according to supplementary note 11 or 12, wherein the image augmentation further includes generating a plurality of the augmented aerial-view images whose angles of rotation are different from each other, and the outputting of the augmented training dataset includes outputting a plurality of the augmented training datasets whose augmented aerial-view images are different from each other.

(Supplementary Note 14)

The storage medium according to any one of supplementary notes 11 to 13, wherein the image augmentation further includes generating the augmented aerial-view image having a same size as the original aerial-view image by compensating for discarded pixels through an image inpainting after the cropping process and the rotation process.

(Supplementary Note 15)

The storage medium according to any one of supplementary notes 11 to 14, wherein the image augmentation further includes performing a circular-shift on the original ground-view image to generate an augmented ground-view image, and the augmented training dataset includes the augmented ground-view image and the augmented aerial-view image.

REFERENCE SIGNS LIST 10 discriminator
12 extraction network
14 extraction network
16 determination network
20 geo-localization system
30 location database
40 original training dataset
42 ground-view image 44 original aerial-view image
50 augmented training dataset
52 ground-view image
54 augmented-aerial-view image
1000 computer
1020 bus
1040 processor
1060 memory
1080 storage device
1100 input/output interface
1120 network interface
2000 image augmentation apparatus
2020 acquisition unit
2040 image processing unit
2060 output unit

What is claimed is:

1. An image augmentation apparatus comprising:
at least one processor; and
memory storing instructions,
wherein the at least one processor is configured to execute the instructions to:
    acquire an original training dataset including a ground-view image and an original aerial-view image;
    perform an image augmentation including a cropping process and a rotation process on the original aerial-view image to generate an augmented aerial-view image, the cropping process being a process by which a target region with a regular polygon shape other than a square is cropped from the original aerial-view image, the rotation process being a process by which the original aerial-view image is rotated, an angle of the rotation being an integer multiple of a center angle of the target region; and
    output an augmented training dataset including the ground-view image and the augmented aerial-view image.

2. The image augmentation apparatus according to claim 1, wherein the image augmentation further includes generating a plurality of the augmented aerial-view images by cropping a plurality of target regions whose shapes are different from each other, and
    wherein the outputting of the augmented training dataset further includes outputting a plurality of the augmented training datasets whose augmented aerial-view images are different from each other.

3. The image augmentation apparatus according to claim 1, wherein the image augmentation further includes generating a plurality of the augmented aerial-view images whose angles of rotation are different from each other, and
    wherein the outputting of the augmented training dataset includes outputting a plurality of the augmented training datasets whose augmented aerial-view images are different from each other.

4. The image augmentation apparatus according to claim 1, wherein the image augmentation further includes generating the augmented aerial-view image having a same size as the original aerial-view image by compensating for discarded pixels through an image inpainting after the cropping process and the rotation process.

5. The image augmentation apparatus according to claim 1, wherein the image augmentation further includes performing a circular-shift on the original ground-view image to generate an augmented ground-view image, and
    wherein the augmented training dataset includes the augmented ground-view image and the augmented aerial-view image.

6. A control method performed by a computer, comprising:
    acquiring an original training dataset including a ground-view image and an original aerial-view image;
    performing an image augmentation including a cropping process and a rotation process on the original aerial-view image to generate an augmented aerial-view image, the cropping process being a process by which a target region with a regular polygon shape other than a square is cropped from the original aerial-view image, the rotation process being a process by which the original aerial-view image is rotated, an angle of the rotation being an integer multiple of a center angle of the target region; and
    outputting an augmented training dataset including the ground-view image and the augmented aerial-view image.

7. The control method according to claim 6, wherein the image augmentation further includes generating a plurality of the augmented aerial-view images by cropping a plurality of target regions whose shapes are different from each other, and
    wherein the outputting of the augmented training dataset further includes outputting a plurality of the augmented training datasets whose augmented aerial-view images are different from each other.

8. The control method according to claim 6, wherein the image augmentation further includes generating a plurality of the augmented aerial-view images whose angles of rotation are different from each other, and
    wherein the outputting of the augmented training dataset includes outputting a plurality of the augmented training datasets whose augmented aerial-view images are different from each other.

9. The control method according to claim 6, wherein the image augmentation further includes generating the augmented aerial-view image having a same size as the original aerial-view image by compensating for discarded pixels through an image inpainting after the cropping process and the rotation process.

10. The control method according to claim 6, wherein the image augmentation further includes performing a circular-shift on the original ground-view image to generate an augmented ground-view image, and
    wherein the augmented training dataset includes the augmented ground-view image and the augmented aerial-view image.

11. A non-transitory computer-readable storage medium storing a program that causes a computer to execute to:
    acquire an original training dataset including a ground-view image and an original aerial-view image;
    perform an image augmentation including a cropping process and a rotation process on the original aerial-view image to generate an augmented aerial-view image, the cropping process being a process by which a target region with a regular polygon shape other than a square is cropped from the original aerial-view image, the rotation process being a process by which the original aerial-view image is rotated, an angle of the rotation being an integer multiple of a center angle of the target region; and
    output an augmented training dataset including the ground-view image and the augmented aerial-view image.

12. The storage medium according to claim 11, wherein the image augmentation further includes generating a plurality of the augmented aerial-view images by cropping a plurality of target regions whose shapes are different from each other, and wherein the outputting of the augmented training dataset further includes outputting a plurality of the augmented training datasets whose augmented aerial-view images are different from each other.

13. The storage medium according to claim 11, wherein the image augmentation further includes generating a plurality of the augmented aerial-view images whose angles of rotation are different from each other, and wherein the outputting of the augmented training dataset includes outputting a plurality of the augmented training datasets whose augmented aerial-view images are different from each other.

14. The storage medium according to claim 11, wherein the image augmentation further includes generating the augmented aerial-view image having a same size as the original aerial-view image by compensating for discarded pixels through an image inpainting after the cropping process and the rotation process.

15. The storage medium according to claim 11, wherein the image augmentation further includes performing a circular-shift on the original ground-view image to generate an augmented ground-view image, and wherein the augmented training dataset includes the augmented ground-view image and the augmented aerial-view image.

* * * * *